(12) United States Patent
Coupart

(10) Patent No.: US 7,538,462 B2
(45) Date of Patent: May 26, 2009

(54) ELECTRICAL MACHINE WITH ROTATING CABLE DRIVE AND INTEGRATED BRAKE

(75) Inventor: Eric Coupart, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 314 days.

(21) Appl. No.: 11/513,153

(22) Filed: Aug. 31, 2006

(65) Prior Publication Data

US 2007/0052308 A1 Mar. 8, 2007

(30) Foreign Application Priority Data

Sep. 5, 2005 (FR) .................................. 05 52683

(51) Int. Cl.
*H02K 7/10* (2006.01)
(52) U.S. Cl. ....................................................... 310/77
(58) Field of Classification Search .................. 310/77, 310/123, 263, 154.01, 154.07, 156.11; 188/171
See application file for complete search history.

(56) References Cited

U.S. PATENT DOCUMENTS

| 5,508,574 | A | * | 4/1996 | Vlock ......................... 310/113 |
| 5,669,469 | A | | 9/1997 | Ericson et al. |
| 5,685,059 | A | | 11/1997 | Ericson et al. |
| 5,789,832 | A | | 8/1998 | Hwang |
| 6,328,136 | B1 | | 12/2001 | Tauchi et al. |
| 7,195,107 | B2 | * | 3/2007 | Gauthier et al. ............. 187/259 |
| 7,322,900 | B2 | * | 1/2008 | Ichioka et al. .............. 475/159 |
| 2004/0206193 | A1 | * | 10/2004 | Ikai .............................. 74/55 |
| 2006/0231338 | A1 | * | 10/2006 | Ichioka et al. .................. 184/6 |

FOREIGN PATENT DOCUMENTS

| EP | 0 736 477 A1 | 10/1996 |
| EP | 1 010 660 A1 | 6/2000 |
| EP | 1 357 076 A1 | 10/2003 |
| EP | 1 405 815 A1 | 4/2004 |
| EP | 1 454 868 A1 | 9/2004 |
| JP | A 9-142761 | 6/1997 |
| JP | A 2001-151443 | 6/2001 |
| WO | WO 2004/005178 A1 | 1/2004 |

* cited by examiner

*Primary Examiner*—Chandrika Prasad
(74) *Attorney, Agent, or Firm*—Oliff & Berridge, PLC

(57) ABSTRACT

An electrical machine may include a rotor, a stator, and at least one electromagnetic brake including at least one brake disk. The rotor may include a monolithic shaft, which may include: at least one pulley-forming portion including at least one annular groove for driving at least one cable, and at least one splined portion in which the at least one brake disk is engaged. An outside diameter of the pulley-forming portion may be at least three times an outside diameter of the splined portion.

24 Claims, 4 Drawing Sheets

ELECTRICAL MACHINE WITH ROTATING CABLE DRIVE AND INTEGRATED BRAKE

This non provisional application claims the benefit of French Application No. 05 52683 filed on Sep. 5, 2005.

The present invention relates to rotating electrical machines intended in particular for driving elevators.

The invention relates more particularly to a machine of relatively small size and including at least one electromagnetic brake.

There is a need to benefit from a machine whose manufacture is relatively easy and inexpensive, of reliable operation and capable of optionally providing an elevator parachute function.

An object of the invention is an electrical machine comprising:
   a rotor,
   a stator,
   at least one electromagnetic brake comprising at least one brake disk, the rotor comprising a monolithic shaft, which includes:
   at least one pulley-forming portion provided with at least one annular groove for driving at least one cable, and
   at least one splined portion in which said at least one brake disk is engaged, the outside diameter of the pulley-forming portion being at least three times that of the splined portion.

In exemplary embodiments where the pulley-forming portion and the splined portion are produced together as a single component, the electromagnetic brake may act on the pulley-forming portion with a single mechanical interface and a single torque transmission, this being an advantageous configuration compared with machines in which the pulley and the brake disk are each attached to the shaft of the rotor in such a way that an action by the brake on the pulley requires two torque transmissions.

In addition, the overall size of the machine according to exemplary embodiments of the invention is relatively small, given that the brake can be placed axially along the longitudinal axis of the machine, and not directly on the external perimeter of the pulley.

The total width of the machine may, in preferred embodiments, be only slightly larger than the outside diameter of the pulley. The overall size of the machine may therefore be determined substantially only by the outside diameter of the pulley. The pulley is driven without any gears. The shaft is preferably not driven by a geared device.

The outside diameter of the pulley-forming portion may be greater than the outside diameter of the splined portion by a factor of at least 3.5, or 4 or even 4.5 and better still 5.

The shaft may be made of steel, especially a machined steel. According to one aspect of the invention, the splines of the splined portion are machined on the shaft.

The width of the annular groove may be greater than 5 mm, or 6 mm, or even 8 mm or indeed 10 mm, depending on the cross section of the cable. The outside diameter of the pulley-forming portion may be approximately 40 times greater than the width of the annular groove, being for example greater than 200 mm, or greater than 240 mm, or greater than 320 mm or even greater than 400 mm.

The machine may be a synchronous motor machine.

The rotor may comprise permanent magnets that are fixed to a stack of magnetic laminations. As a variant, the rotor may comprise permanent magnets fixed directly to the shaft. The permanent magnets may be fixed to the rest of the rotor by adhesive bonding or by other means, especially by clamping. A rotor may have no magnetic laminations.

The shaft may rest on an end flange of the machine via a bearing in which the shaft is engaged.

The pulley-forming portion may surround the outside of the bearing, at least partially.

The shaft may include a central recess that extends axially over at least a major part of the stator. The shaft may include a central recess that has an inside diameter greater than the outside diameter of the splined portion.

The pulley-forming portion may be in contact with the radially external surface of a bearing.

The splined portion may be placed, relative to the stator, on the opposite side from the pulley-forming portion. As a variant, the splined portion may be placed, relative to the pulley-forming portion, on the opposite side from the stator.

The shaft may comprise two splined portions placed, relative to the pulley-forming portion, one on the opposite side from the stator and the other on the same side as the stator.

Preferably, the rotor is an internal rotor and the stator is an external stator.

The machine may include at least one annular groove beneath the pulley-forming portion.

A further object of the invention is also, according to another of its aspects, independently of or in combination with the foregoing, an electrical machine comprising:
   a permanent magnet rotor,
   a stator,
   at least one electromagnetic brake comprising at least one brake disk, the rotor comprising a monolithic shaft, which includes:
   at least one pulley-forming portion provided with at least one annular groove for driving at least one cable, and
   at least one splined portion in which said at least one brake disk is engaged, the rotor having no magnetic laminations.

A further object of the invention is also, according to another of its aspects, independently of or in combination with the foregoing, an electrical machine comprising:
   a permanent magnet rotor,
   a stator,
   at least one electromagnetic brake comprising at least one brake disk, the rotor comprising a monolithic shaft, which includes:
   at least one pulley-forming portion provided with at least one annular groove for driving at least one cable, and
   at least one splined portion in which said at least one brake disk is engaged, the shaft having a central recess.

The central recess may have an inside diameter greater than the outside diameter of the splined portion. The central recess may extend axially over at least the major part of the stator.

A further object of the invention is also, according to another of its aspects, independently of or in combination with the foregoing, an electrical machine comprising:
   a permanent magnet rotor,
   a stator,
   at least one electromagnetic brake comprising at least one brake disk, the rotor comprising a monolithic shaft, which includes:
   at least one pulley-forming portion provided with at least one annular groove for driving at least one cable, and
   at least one splined portion in which said at least one brake disk is engaged, both the splined portion and the pulley-forming portion being machined.

A further object of the invention is also elevator machinery comprising at least one cable connected to a cabin and moved by an electrical machine as defined above. The machinery may include several cables of approximately circular cross section.

The invention may be more clearly understood on reading the detailed description that follows and by examining the appended drawing in which.

Figure 1:
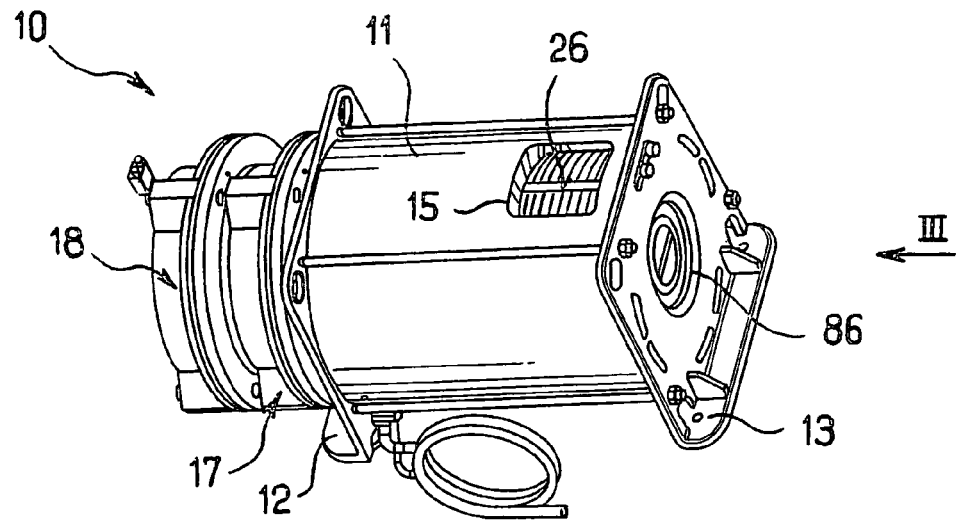
FIG. 1 is a schematic view, in perspective, of one example of a machine produced according to the invention.

The electrical machine 10 shown in FIGS. 1 to 4 is intended to drive elevator cables and comprises a casing 11 provided at each of its ends with flanges 12 and 13 that are to be fixed to a frame.

The machine includes, on one side of the casing, at least one electromagnetic brake 17 and, in the example in question, two electromagnetic brakes 17 and 18.

Figure 2:
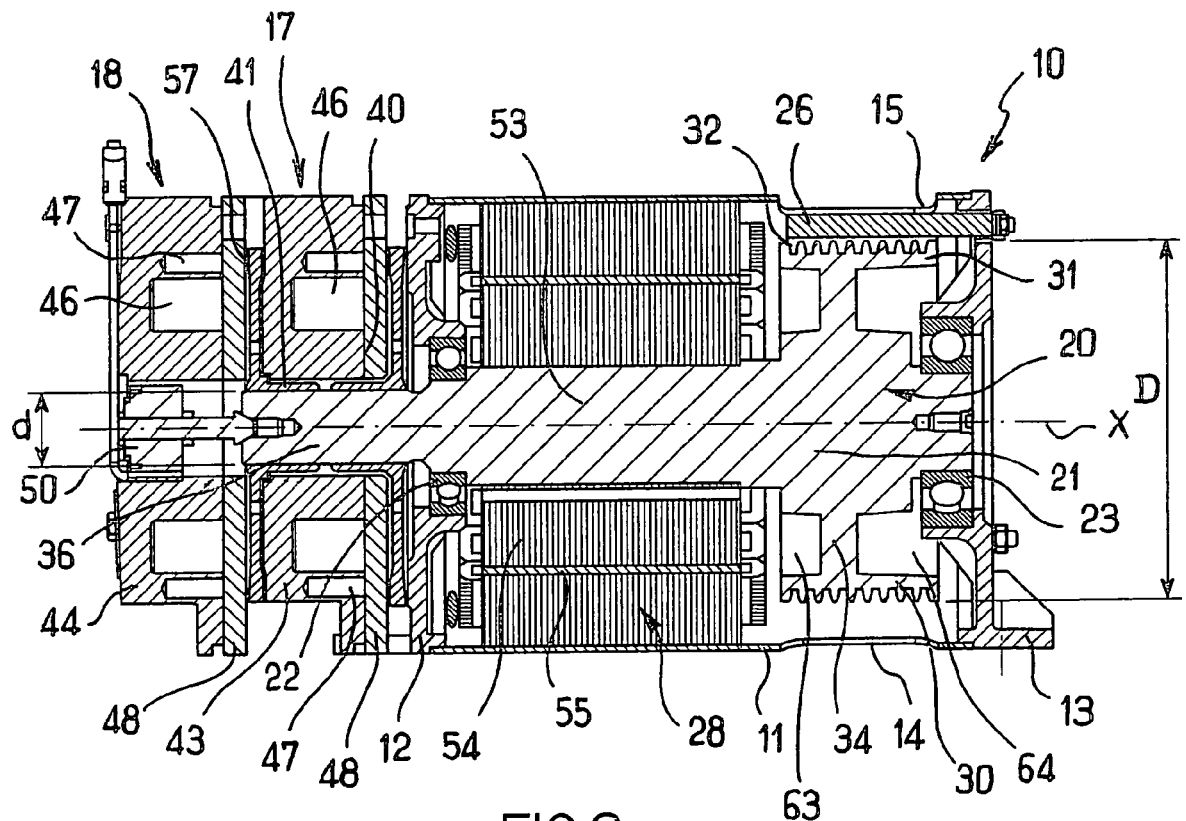
FIG. 2 is a longitudinal sectional view of the machine of FIG. 1.
Figure 3:
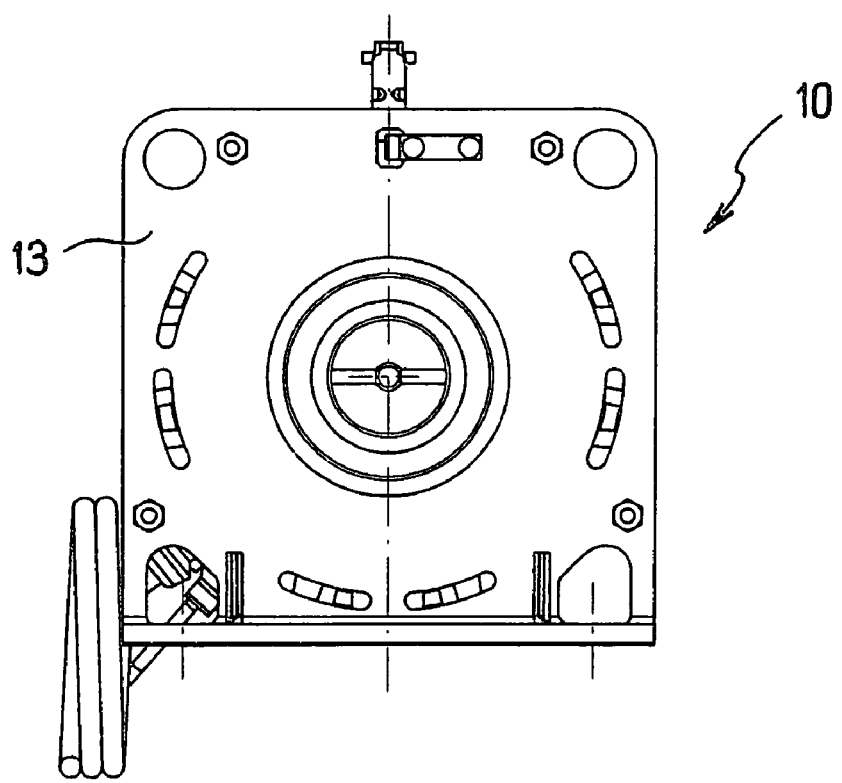
FIG. 3 is a side view on III of the machine of FIG. 1.

Referring to FIG. 2, it may be seen that the machine comprises a rotor 20 and a stator 28 placed inside the casing 11, the rotor 20 rotating about a rotation axis X, which is also the longitudinal axis of the machine 10 in the example in question.

The rotor 20 comprises a monolithic shaft 21, made of machined steel, rotating on bearings 22 and 23 supported by the flanges 12 and 13.

The shaft 21 comprises a pulley-forming portion 30 adjacent the flange 13, this pulley-forming portion 30 comprising a peripheral portion 31 provided with annular grooves 32 and being connected to the rest of the shaft by a radial portion 34. Two annular grooves 63 and 64 are made beneath the peripheral portion 31 on either side of the radial portion 34, thereby allowing the shaft to be lightened.

The annular grooves 32 are designed to receive cables of approximately circular cross section, consisting of twisted metal and/or plastic filaments. The cables may comprise strands of circular or noncircular cross section, for example of different diameter or produced in different materials.

A groove may have a bottom of partially circular shape in cross section. As a variant, a groove may comprise two sidewalls converging on the axis of rotation of the machine.

The spacing between two grooves of the pulley may, where appropriate, not be constant.

The casing 11 includes, in its lower part, an opening 14 for passage of the cables and, in the upper part, a window 15 for installing and observing the cables engaged in the machine. A finger 26 is fixed to the flange 13 in order to prevent the cable(s) from leaving the groove(s) 32 of the pulley-forming portion 30.

Furthermore, the end flange 13 of the machine includes an opening 86 allowing access to the shaft 21.

Figure 4:
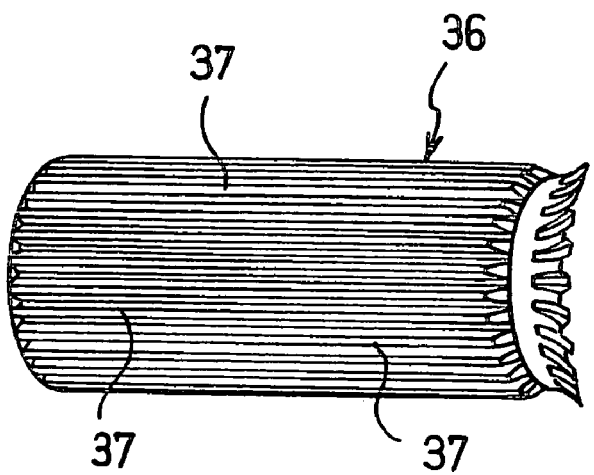
FIG. 4 shows, separately and in perspective, a portion of the shaft of the machine of FIG. 2.

The shaft 21 includes, on the opposite side from the pulley-forming portion 30, a splined portion 36 that extends axially beyond the flange 12, comprising splines 37, as may be seen in FIG. 4.

Engaged in this splined portion 36 are the hubs of two brake disks 40 and 41 belonging to the brakes 17 and 18, respectively.

On their periphery, these disks conventionally include linings 57.

The brakes 17 and 18 include respective yokes 43 and 44, each having a housing 46 for accommodating an electromagnet (not shown) and housings 47 for accommodating springs which apply, in the absence of a magnetic field generated by the electromagnet, an armature 48 against the corresponding brake disk. Spacers (not shown) are provided in order to ensure translational guiding of the armatures 48.

An encoder 50, either of the electrooptic or magnetic detection type, is mounted at one end of the shaft 21 in order to read its rotation.

The shaft 21 includes a central portion 53 that supports a stack of magnetic laminations 54 on which permanent magnets 55 are mounted. The latter may be adhesively bonded or, as a variant, may be inserted into corresponding housings provided in the stack of laminations 54.

The magnets 55 interact with the poles of the stator 28, which includes windings (not shown). The stator 28 is, for example of the concentric winding type, comprising teeth, each tooth accommodating one winding, the axis of which is coincident with that of the tooth.

The machine of FIGS. 1 and 2 has the advantage of having only one torque transmission between the pulley-forming portion 30 and the brake disks 40 and 41, via the splined portion 36 thereby increasing safety.

In addition, in the example in question, the diameter of the machine is only slightly larger than the diameter D of the pulley-forming portion 30. This makes it easier to install the machine in elevator machinery.

The diameter d of the splined portion 36 is, in the example in question, less than one third of the outside diameter D of the pulley-forming portion, where D/d is around 5.

The embodiment shown in FIG. 5 differs from that described with reference to FIGS. 1 to 4 by the structure of the rotor 20 and more particularly by the shape of the shaft 21.

In this embodiment, the shaft 21 has a wider radial portion 34 for joining to the peripheral portion 30, and a larger-diameter central portion 53 on the surface 60 of which the permanent magnets 55 are mounted, for example by adhesive bonding.

The rotor thus has no stack of laminations, unlike the example shown in FIG. 2.

The shaft 21 is more rigid, owing to the increase in its diameter. This may reduce the operating noise of the machine.

In this example, the shaft 21 is preferably made of a magnetic steel, whereas the shaft 21 in the example shown in FIG. 2 is for example made of a steel not having special magnetic properties, for example a nonmagnetic steel.

Figure 5:
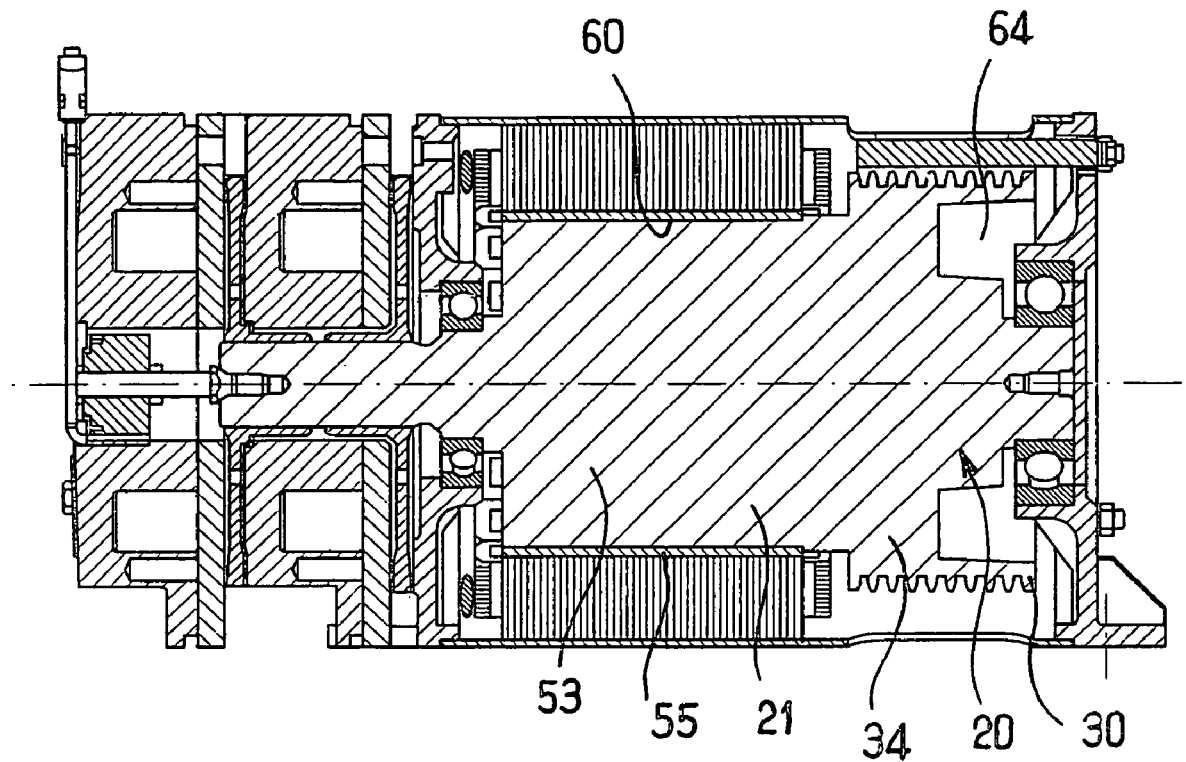
FIG. 5 is a view similar to FIG. 2 of an alternative embodiment of the invention.
Figure 6:
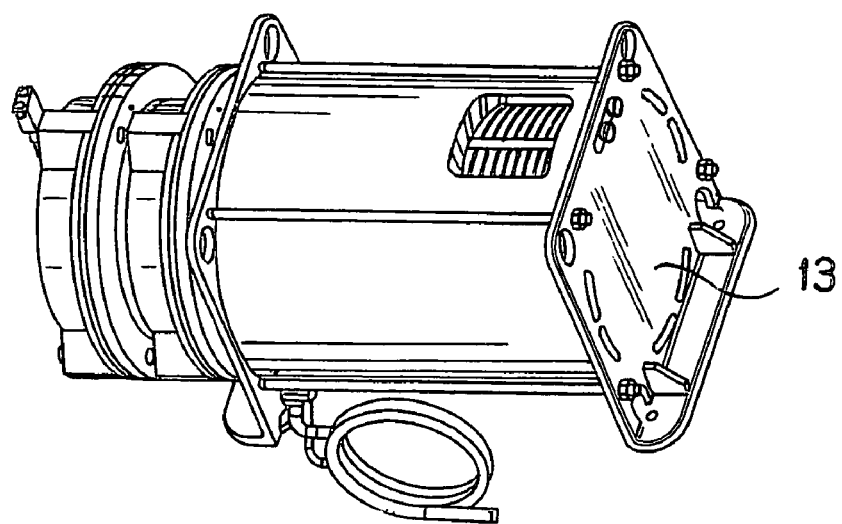
FIG. 6 shows, schematically and in perspective, another example of a machine produced according to the invention.
Figure 7:
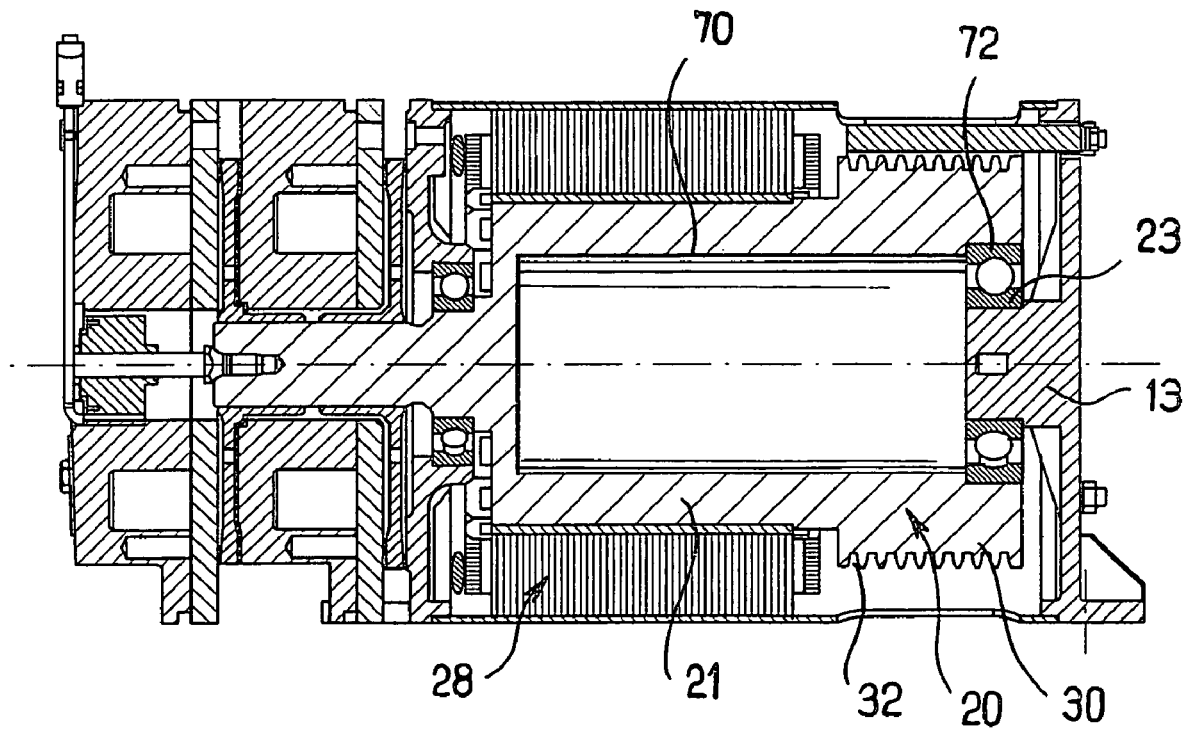
FIG. 7 is a longitudinal sectional view of the machine of FIG. 6.

The alternative embodiment illustrated in FIGS. 6 and 7 differs from the examples shown in FIGS. 2 and 5, in particular by the way in which the rotor is produced.

In this example, the shaft 21 includes a central recess 70 open on the side facing the flange 13 and bears via a radially internal surface 72 on the bearing 23.

The recess 70 extends over the major part of the length of the stator 28, thereby lightening the rotor and reducing the amount of material of the latter, and therefore reducing its cost.

The shaft 21 includes, on the side facing the flange 13, a thicker portion, on the periphery of which the grooves 32 are produced.

Thus, in the example shown in FIG. 7, the grooves 32 are supported over their entire length by a relatively large thickness of material, whereas in the examples of FIGS. 2 and 5, some of the grooves 32 are supported by a smaller thickness of material owing to the presence of the annular grooves 63 and 64.

Furthermore, some of the grooves 32 surround the bearing 23, thereby improving the load uptake.

The shape of the flange 13 in the example of FIGS. 6 and 7 is slightly modified from that of the examples of the previously described figures, owing to the different way in which the bearing 23 is mounted. The flange 13 has no central opening 86.

Of course, the invention is not limited to the examples that have just been described.

The machine may be produced with a single electromagnetic brake or with more than two electromagnetic brakes.

Figure 8:
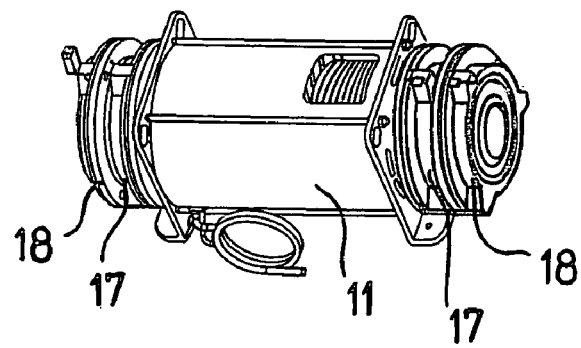
FIG. 8 is a perspective view of another example of a machine according to the invention.

The machine may comprise an electromagnetic brake that is located on the side facing the flange 13 and not on the opposite side.

Where appropriate, the machine may comprise at least one electromagnetic brake on each side of the casing, in which case the shaft may comprise two splined portions at its ends, as illustrated in FIG. 8.

Where appropriate, the pulley comprises only a single groove and accommodates only a single cable.

Where appropriate, the machine may comprise several pulley-forming portions.

The diameter D is, for example, at least equal to 200 mm, or 240 mm or 320 mm or even 400 mm, for example depending on the size of the cable. The diameter of a cable accommodated in a groove is, for example, at least 5 mm, for example between 5 and 10 mm, these values being given merely as examples.

The expression "comprising one" or "comprising a" must be understood as being synonymous with "comprising at least one", unless otherwise specified.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An electrical machine comprising:
   a rotor,
   a stator,
   at least one electromagnetic brake comprising at least one brake disk, the rotor comprising a monolithic shaft, the monolithic shaft including:
   at least one pulley-forming portion including at least one annular groove for driving at least one cable, and
   at least one splined portion in which said at least one brake disk is engaged, an outside diameter of the pulley-forming portion being at least three times an outside diameter of the splined portion.

2. The machine of claim 1, wherein the outside diameter of the pulley-forming portion is greater than the outside diameter of the splined portion by a factor of at least 3.5.

3. The machine of claim 2, wherein the factor is at least 4.

4. The machine of claim 3, wherein the factor is at least 5.

5. The machine of claim 1, wherein the shaft comprises steel.

6. The machine of claim 5, wherein the shaft comprises machined steel.

7. The machine of claim 1, wherein a width of the annular groove is greater than 5 mm.

8. The machine of claim 7, wherein the width is greater than 10 mm.

9. The machine of claim 1, wherein the outside diameter of the pulley-forming portion is approximately 40 times greater than a width of the annular groove.

10. The machine of claim 1, wherein the outside diameter of the pulley-forming portion is greater than 200 mm.

11. The machine of claim 1, wherein the rotor comprises permanent magnets that are fixed to a stack of magnetic laminations.

12. The machine of claim 1, wherein the rotor comprises permanent magnets fixed directly to the monolithic shaft.

13. The machine of claim 1, further comprising permanent magnets fixed to the rotor by adhesive bonding.

14. The machine of claim 1, wherein the pulley-forming portion is in contact with a radially external surface of a bearing.

15. The machine of claim 1, wherein the monolithic shaft includes a central recess that extends axially over at least a major part of the stator.

16. The machine of claim 1, wherein the shaft includes a central recess that includes an inside diameter greater than the outside diameter of the splined portion.

17. The machine of claim 1, wherein the shaft rests on an end flange of the machine via a bearing in which the shaft is engaged.

18. The machine of claim 1, wherein the splined portion is situated, relative to the stator, on an opposite side from the pulley-forming portion.

19. The machine of claim 1, wherein the splined portion is situated, relative to the pulley-forming portion, on an opposite side from the stator.

20. The machine of claim 1, wherein the monolithic shaft comprises two splined portions that are respectively situated, relative to the pulley-forming portion, on an opposite side from the stator and on a same side as the stator.

21. The machine of claim 1, wherein the rotor includes no magnetic laminations.

22. The machine of claim 1, further comprising at least one annular groove radially inward from the pulley-forming portion.

23. Elevator machinery comprising at least one cable connected to a cabin and moved by an electrical machine as defined in claim 1.

24. The elevator machinery of claim 23, wherein the at least one cable comprises several cables of substantially circular cross section.

* * * * *